United States Patent
Wang

(10) Patent No.: US 9,247,109 B2
(45) Date of Patent: Jan. 26, 2016

(54) PERFORMING SPATIAL AND TEMPORAL IMAGE CONTRAST DETECTION IN PIXEL ARRAY

(71) Applicant: Samsung Electronics Co., Ltd., Suwon-si, Gyeonggi-do (KR)

(72) Inventor: Yibing Michelle Wang, Temple City, CA (US)

(73) Assignee: SAMSUNG ELECTRONICS CO., LTD. (KR)

(*) Notice: Subject to any disclaimer, the term of this patent is extended or adjusted under 35 U.S.C. 154(b) by 25 days.

(21) Appl. No.: 14/103,834

(22) Filed: Dec. 11, 2013

(65) Prior Publication Data

US 2014/0263961 A1 Sep. 18, 2014

Related U.S. Application Data

(63) Continuation-in-part of application No. 13/832,071, filed on Mar. 15, 2013, and a continuation-in-part of application No. 13/901,564, filed on May 23, 2013.

(60) Provisional application No. 61/865,594, filed on Aug. 13, 2013.

(51) Int. Cl.
| | |
|---|---|
| *H01L 27/00* | (2006.01) |
| *H04N 5/14* | (2006.01) |
| *H04N 3/14* | (2006.01) |
| *H04N 5/369* | (2011.01) |
| *H04N 5/335* | (2011.01) |
| *H04N 5/232* | (2006.01) |
| *H04N 5/353* | (2011.01) |
| *H04N 5/3745* | (2011.01) |
| *H04N 5/378* | (2011.01) |
| *H04N 9/04* | (2006.01) |

(52) U.S. Cl.
CPC ............... *H04N 5/144* (2013.01); *H04N 3/155* (2013.01); *H04N 5/335* (2013.01); *H04N 5/3696* (2013.01); *H04N 5/23254* (2013.01); *H04N 5/353* (2013.01); *H04N 5/378* (2013.01); *H04N 5/3745* (2013.01); *H04N 9/045* (2013.01)

(58) Field of Classification Search
CPC ...... H04N 5/144; H04N 5/145; H04N 3/1556
USPC ....................................................... 250/208.1
See application file for complete search history.

(56) References Cited

U.S. PATENT DOCUMENTS

| | | | |
|---|---|---|---|
| 5,990,471 A * | 11/1999 | Watanabe | 250/208.1 |
| 7,274,393 B2 | 9/2007 | Acharya | |
| 8,344,306 B2 | 1/2013 | Kim | |
| 2006/0139470 A1* | 6/2006 | McGowan | 348/294 |
| 2012/0081571 A1 | 4/2012 | Jang et al. | |

* cited by examiner

*Primary Examiner* — Thanh Luu
(74) *Attorney, Agent, or Firm* — Renaissance IP Law Group LLP

(57) ABSTRACT

An imaging device has an array with pixels that can image an aspect of an object. In addition, pixels in the array can be used to perform motion detection or edge detection. A first and a second pixel can integrate light non-concurrently, and then their outputs may be compared. A difference in their outputs may indicate an edge in an imaging operation, and motion in a motion detection operation. The motion detection operation may be performed without needing the imaging device to have an additional modulated LED light source, and to spend the power to drive that source.

29 Claims, 16 Drawing Sheets

IMAGING DEVICE

*IMAGING DEVICE*

GROUP OF ARRAY PIXELS

*MOTION / EDGE DETECTION*

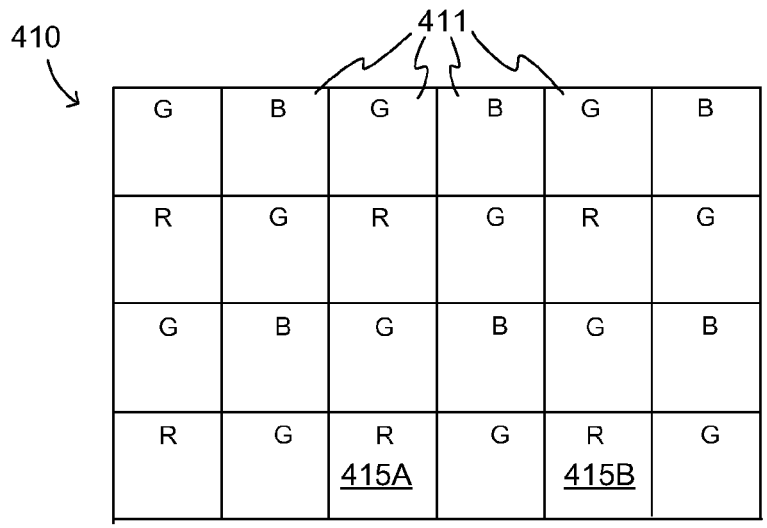
FIG. 4     *GROUP OF COLOR PIXELS*
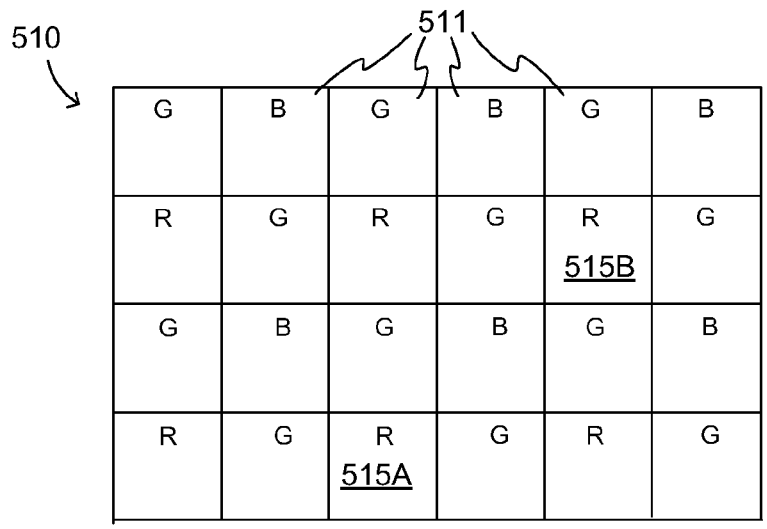
FIG. 5     *GROUP OF COLOR PIXELS*

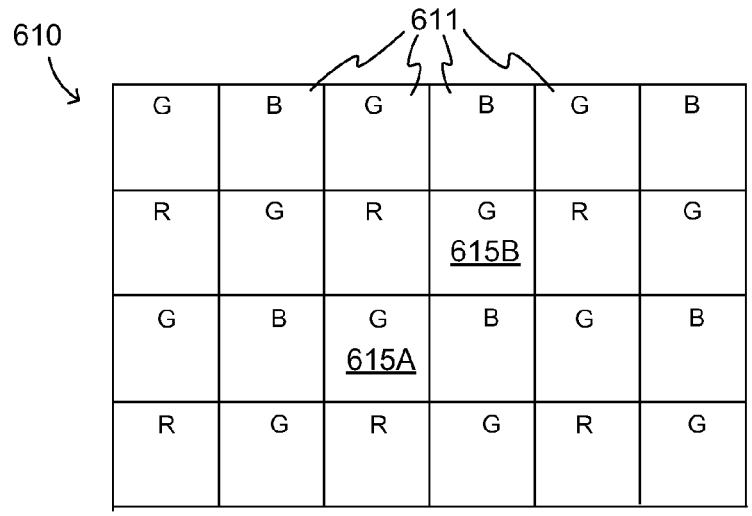
FIG. 6  *GROUP OF COLOR PIXELS*
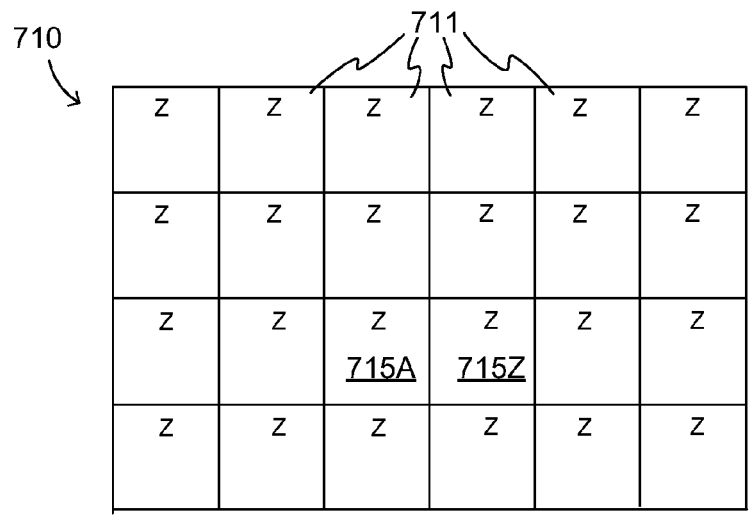
FIG. 7  *GROUP OF DEPTH PIXELS*

812

| G | R | G | R |
| B | G | B | G |
| G | Z | G | R |
| B |   | B | G |
| G | 820 | G | R |
| B |   | B | G |
| G | R | G | R |
| B | G | B | G |

**KERNEL OF ARRAY PIXELS
(COLOR & DEPTH)**

FIG. 8

*KERNELS OF ARRAY PIXELS (COLOR & DEPTH)*

**TIMING FOR PIXEL CIRCUITS
– MOTION DETECTION**

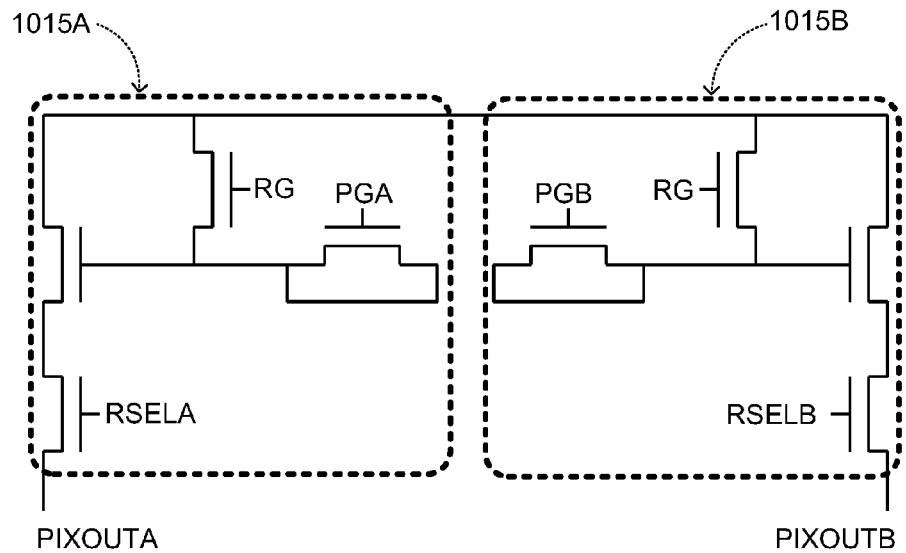
FIG. 10   *PIXEL CIRCUITS*
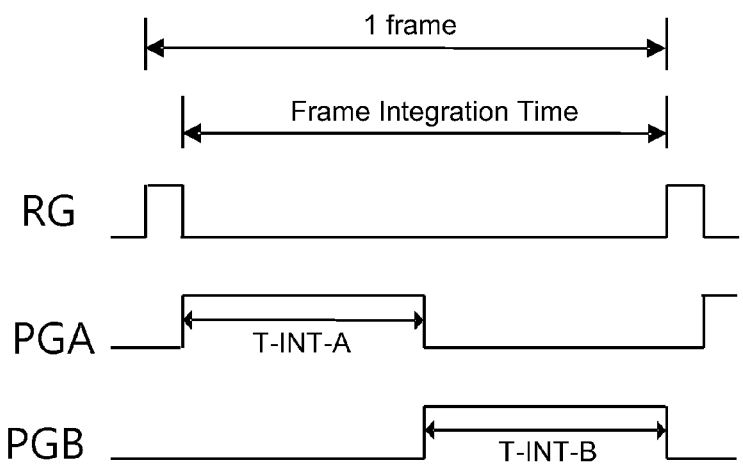
FIG. 11   *TIMING FOR PIXEL CIRCUITS*

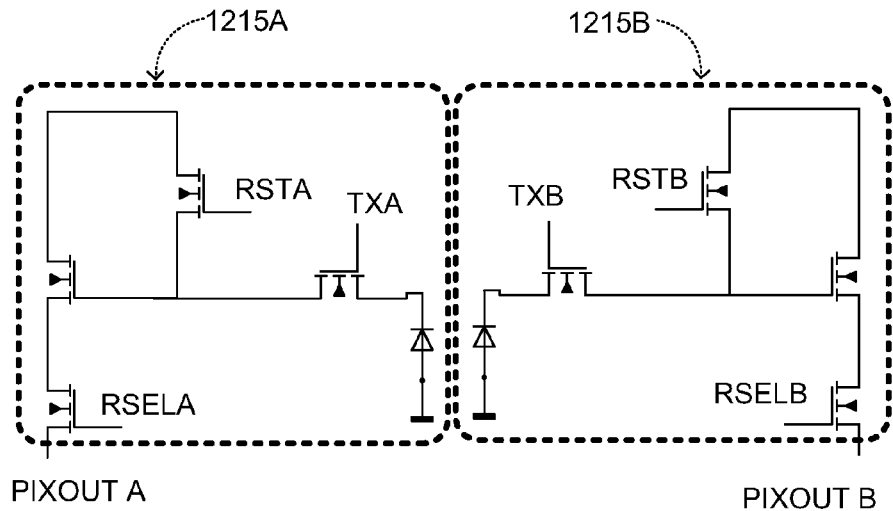
FIG. 12  PIXEL CIRCUITS
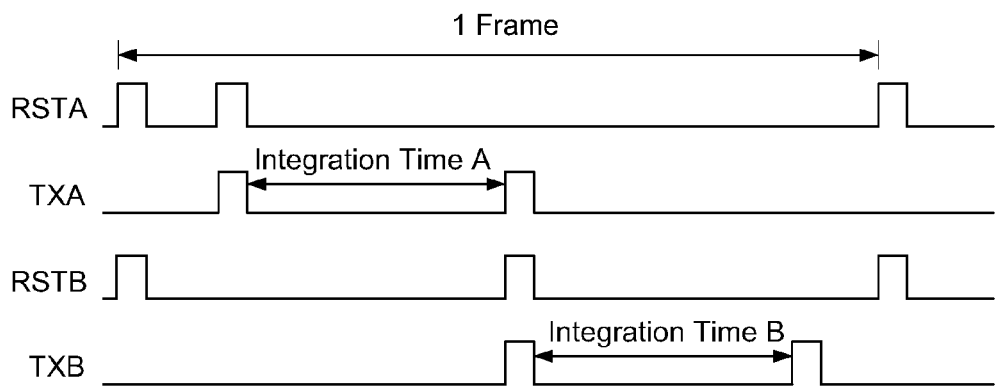
FIG. 13  TIMING FOR PIXEL CIRCUITS

PIXEL COMBINING ARRANGEMENT

FIG. 17

PIXEL COMBINING ARRANGEMENT

FIG. 18

FIG. 19 *RECONFIGURING OPERATION*

SYSTEM FOR IMAGING DEVICE

PERFORMING SPATIAL AND TEMPORAL IMAGE CONTRAST DETECTION IN PIXEL ARRAY

CROSS REFERENCE TO RELATED PATENT APPLICATIONS

This patent application is a Continuation-In-Part of co-pending U.S. patent application Ser. No. 13/832,071, filed on Mar. 16, 2013, titled: "IMAGE SENSOR, OPERATION METHOD THEREOF, AND SYSTEM INCLUDING THE SAME", the disclosure of which is hereby incorporated by reference for all purposes.

This patent application is a Continuation-In-Part of co-pending U.S. patent application Ser. No. 13/901,564, filed on May 23, 2013, titled: "RGBZ PIXEL ARRAYS, IMAGING DEVICES, CONTROLLERS & METHODS", the disclosure of which is hereby incorporated by reference for all purposes.

This patent application claims priority from U.S. Provisional Patent Application Ser. No. 61/865,594, filed on Aug. 13, 2013, titled: "SPATIAL AND TEMPORAL CONTRAST DETECTION SENSOR", the disclosure of which is hereby incorporated by reference for all purposes.

BACKGROUND

Modern imaging devices use electronic arrays to capture images. The arrays have pixels that generate electric charges, such as electrons, when they are exposed to light from an image. The generated charges of each pixel are stored and then read out, for rendering the image.

It is possible for imaging devices in the prior art to detect movement. However, such detection often requires that that the pixels image twice, in other words, integrate over two frames, and then that the two frames be contrasted. Such consumes a lot of power.

In other instances, detection of movement requires that the object be illuminated with a modulated light source. Light sources consume power, while it is desired to preserve power within the imaging device.

BRIEF SUMMARY

The present description gives instances of imaging devices, some of their components and methods, the use of which may help overcome problems and limitations of the prior art.

In one embodiment, an imaging device has an array with pixels that can image an aspect of an object. In addition, pixels in the array can be used to perform motion detection or edge detection. A first and a second pixel can integrate light non-concurrently, and then their outputs may be compared. A difference in their outputs may indicate an edge in an imaging operation, and motion in a motion detection operation.

An advantage over the prior art is that the motion detection operation may be performed without needing the imaging device to have an additional modulated LED light source, and to spend the power to drive that source. Moreover, motion detection may be performed in a single frame, which does not tax the frame rate.

These and other features and advantages of this description will become more readily apparent from the following Detailed Description, which proceeds with reference to the drawings, in which:

BRIEF DESCRIPTION OF THE DRAWINGS

FIG. 4 is a diagram of the group of pixels of FIG. 2, according to an embodiment that includes color pixels.

FIG. 5 is a diagram of the group of pixels of FIG. 2, according to another embodiment that includes color pixels.

FIG. 6 is a diagram of the group of pixels of FIG. 2, according to one more embodiment that includes color pixels.

FIG. 7 is a diagram of the group of pixels of FIG. 2, according to an embodiment that includes depth pixels.

FIG. 8 is a diagram of a kernel of pixels of an array of the device of FIG. 1, according to an embodiment that includes both color pixels and at least one depth pixel.

FIG. 10 is a sample embodiment of circuit diagrams for the two pixels of FIG. 3.

FIG. 11 is a sample embodiment of a timing diagram of control signals that can be applied to and be received by the pixels of FIG. 10.

FIG. 12 is another sample embodiment of circuit diagrams for the two pixels of FIG. 3.

FIG. 13 is a sample embodiment of a timing diagram of control signals that can be applied to and be received by the pixels of FIG. 12.

FIG. 17 is a diagram of how pixels in an array can be paired according to an embodiment, using the groupings of both FIG. 15 and FIG. 16.

FIG. 18 is a diagram of how pixels in an array can be paired according to another embodiment, using the groupings of both FIG. 15 and FIG. 16.

DETAILED DESCRIPTION

As has been mentioned, the present description is about imaging devices, some of their components, and methods. Embodiments are now described in more detail.

Figure 1:
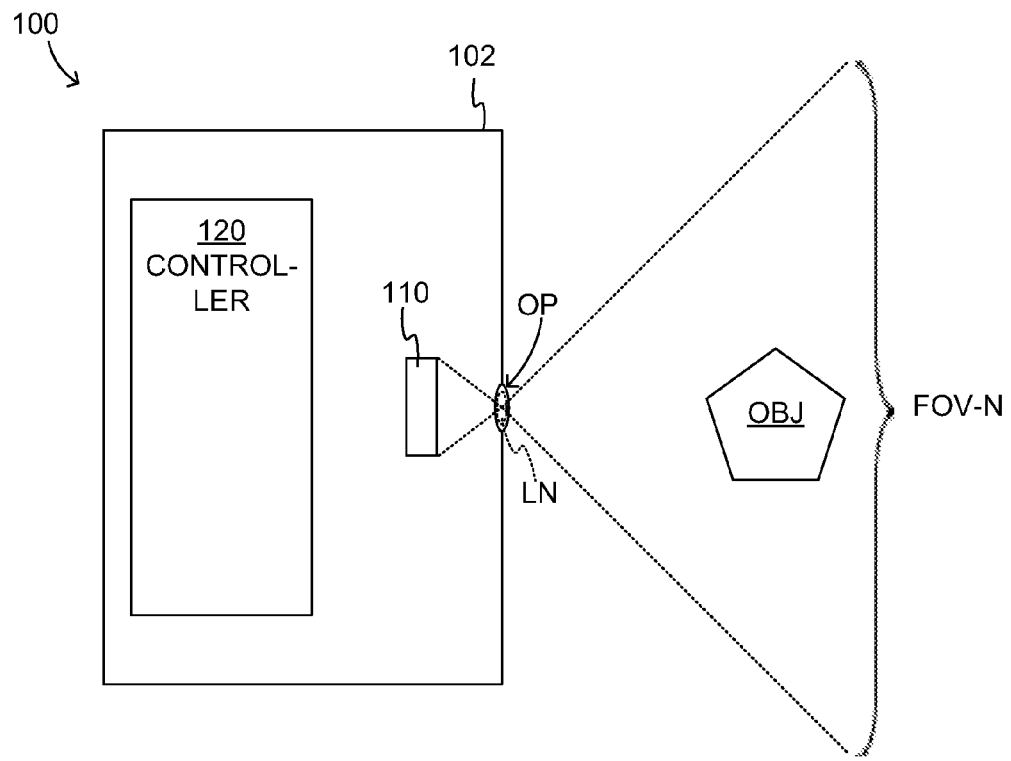
FIG. 1 is a block diagram of an imaging device made according to embodiments.

FIG. 1 is a block diagram of an imaging device 100 made according to embodiments. Imaging device 100 has a casing 102, and includes an opening OP in casing 102. A lens LN may be provided optionally at opening OP, although that is not necessary.

Imaging device 100 also has a pixel array 110 made according to embodiments. Pixel array 110 is configured to receive light through opening OP, so imaging device 100 can capture an image of an object OBJ, person, or scene. As can be seen, pixel array 110 and opening OP define a nominal Field of View FOV-N. Of course, Field of View FOV-N and object OBJ are in three dimensions, while FIG. 1 shows them in two dimensions. Further, if lens LN is indeed provided, the resulting actual field of view may be different than the nominal Field of View FOV-N. Imaging device 100 is aligned so that object OBJ, person, or scene that is to be imaged is within the actual field of view.

Device 100 additionally includes a controller 120, for controlling the operation of pixel array 110 and other components of imaging device 100. Controller 120 may optionally be formed integrally with pixel array 110, and possibly also with other components of imaging device 100.

Device 100 can render the image from the elements captured by the pixels. The pixels of pixel array 110 can capture elements of the image. In many embodiments, pixel array 110 has a two-dimensional array of pixels. The array can be organized in rows and columns. Examples are now described.

Figure 2:
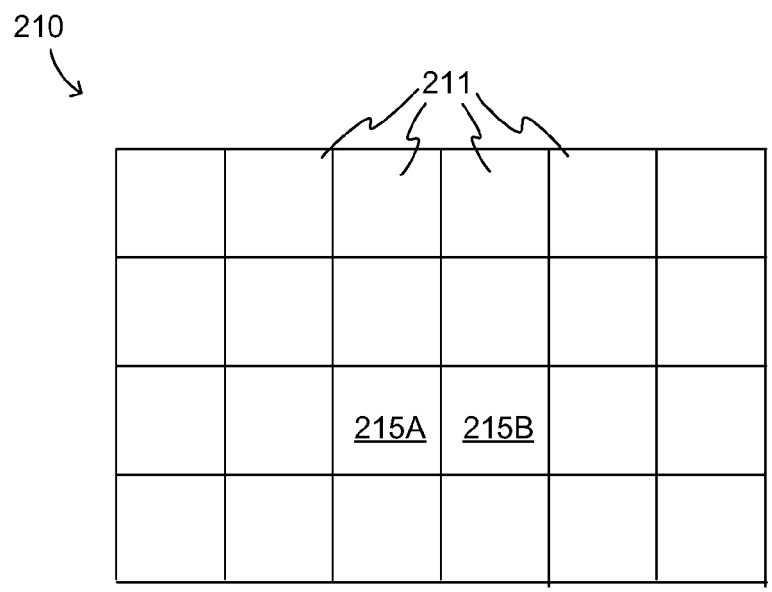
FIG. 2 is a diagram of a front view of a group of pixels of an array of the device of FIG. 1 according to a general embodiment.

FIG. 2 is a diagram of a front view of a group 210 of pixels in array 110 of FIG. 1, according to a general embodiment. Group 210 includes first pixel 215A, second pixel 215B, and other pixels 211. Array 110 can be made of groups similar to group 210, or other pixels.

Referring also to FIG. 1, controller 120 is configured to transmit to pixels 211, 215A, 215B control signals. The control signals can be of a first type or of a second type.

If the control signals are of the first type, they may cause these pixels to concurrently image an aspect of an object. The aspect could be, for example, a color of the object. Pixels that image color are sometimes also called color pixels. Alternately, the imaged aspect can be the distance of the object from the pixel array. That distance is also called depth ("Z"), and pixels that image depth are sometimes also called depth pixels.

Figure 3:
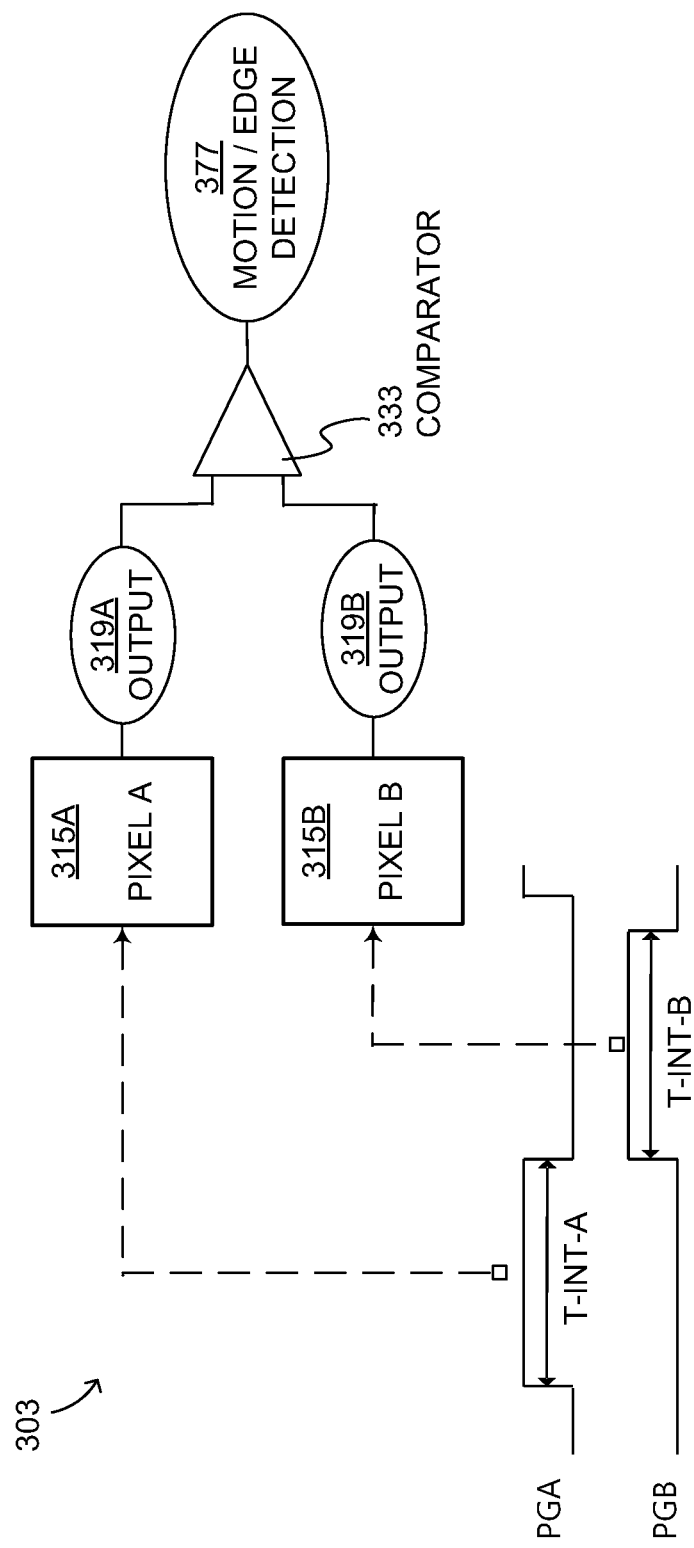
FIG. 3 is a conceptual diagram illustrating motion detection or edge detection from two pixels of FIG. 2, according to embodiments.

FIG. 3 shows a conceptual diagram 303. Two pixels in a group are shown, namely Pixel A 315A and Pixel B 315B, which can also be called the first pixel and the second pixel. Pixels 315A and 315B could be, for example, pixels 215A, 215B of group 210.

In diagram 303, sample control signals of the second type PGA, PGB are shown. These sample control signals control the times during which Pixel A 315A and Pixel B 315B integrate light from object OBJ of FIG. 1. As can be seen, during time T-INT-A, first pixel 315A integrates light from object OBJ, while second pixel 315B does not. And, during the subsequent time T-INT-B, second pixel 315B integrates light from object OBJ, while first pixel 315A does not. Therefore, the first pixel does not image concurrently with the second pixel.

While Pixel A 315A integrates light, it generates an output 319A. While Pixel B 315B integrates light, it generates an output 319B. Outputs 319A, 319B are not generated concurrently.

Embodiments of an imaging device further include a comparator, such as comparator 333 in FIG. 3. In some embodiments, the comparator is formed integrally with array 110. The comparator is configured to compare an output of the first pixel in the group, such as output 319A from Pixel A 315A, to an output of the second pixel, such as output 319B from Pixel B 315B. Of course, since outputs 319A and 319B are not generated concurrently, the first one of them may have to be stored in the interim.

Comparator 333 has an output 377. In some embodiments, a motion of the pixel array 110 with respect to object OBJ is detected from output 377. In other embodiments, an edge of object OBJ is detected. If the compared pixels outputs are the same, or substantially the same, then neither motion nor an edge is indicated. The output can be as short as 2 μsec per row, which is a fast readout. The data bandwidth can be small, namely 2 bits per pixel, if it is desired to preserve all three possible outcomes (namely: 1) A>B, 2) A=B, 3) A<B), or even one bit per pixel if it is desired to preserve only two outcomes (namely: 1) A< >B, 2) A=B).

The detected motion can be useful in a number of ways. For example, imaging device 100 may further have an additional component, which is configured to be in one of at least two states. The additional component could be a screen or display, which can be either in a first state of lower power, or in a second state of full power. The component may transition from the first state to the second responsive to the motion being detected. For example, the screen might be in the low power state so as to conserve power, and transition to the full power state once motion is detected, which can be associated with user interest.

Returning to FIG. 2, the pixels in group 210 can be made in any number of ways. The first pixel can be made substantially identically to one or more of the other pixels in the group. It could also be made substantially identically to the second pixel. Embodiments are now described.

FIG. 4 is a diagram of a pixel group 410, which is an embodiment of group 210 that includes color pixels. The color pixels generate an image in terms of three colors, namely red (R), green (G), and blue (B). Group 410 includes first pixel 415A, second pixel 415B, and other pixels 411. The motion is detected from the outputs of at least pixels 415A and 415B. In this embodiment, both pixels 415A and 415B are Red, but that is only an example. They could both be Blue, Green, or a combination, but preferably they are of the same color.

FIG. 5 is a diagram of a pixel group 510, which is an embodiment of group 210 that includes R, G, and B color pixels. Group 510 includes first pixel 515A, second pixel 515B, and other pixels 511. The motion is detected from the outputs of pixels 515A and 515B. In this embodiment, both pixels are Red and, again, that is only an example. They could both be Blue, Green, or a combination.

The choice of the first and the second pixel can be guided by a desire that they be similar, and that they be as close as possible to each other, so as to draw a sharper contrast. As such, in many embodiments such as in the above, there is at most one other pixel between the first pixel and the second pixel. One more example is described.

FIG. 6 is a diagram of a pixel group 610, which is an embodiment of group 210 that includes R, G, and B color pixels. Group 610 includes first pixel 615A, second pixel 615B, and other pixels 611. The motion is detected from the outputs of pixels 615A and 615B. In this embodiment, these pixels are closer to each other than the previous examples, by both being Green in a Bayer pattern.

In some embodiments, substantially all pixels in the group could be made substantially identically to each other. An embodiment is now described.

FIG. 7 is a diagram of a pixel group 710, which is an embodiment of group 210 that includes depth pixels Z. Depth pixels Z are used to determine the distance, or depth, from the imaging device to object OBJ. The device includes a source of modulated light, which is reflected from object OBJ and received by depth pixels Z. Group 710 includes first pixel 715A, second pixel 715B, and other pixels 711. The motion is detected from the outputs of at least pixels 715A and 715B.

In some embodiments, the pixels include both color pixels and depth pixels. For example, FIG. 8 is a diagram of a kernel 812 of pixels of array 110, according to an embodiment that includes both color pixels R, G, B and at least one depth pixel Z 820. The pixels whose outputs to be compared can be the color pixels as seen in the previous examples, in which case kernel 812 is the group itself. Alternately, pixels whose outputs to be compared can be the depth pixels of the different kernels that array 110 is made of. Only one depth pixel is shown in kernel 812, and its output would be compared with the output of another depth pixel.

In some of these embodiments, the depth pixels are made as an aggregation of some of the color pixels, with adjustments for consistency, as described in more detail in the incorporated co-pending U.S. patent application Ser. No. 13/901,564. An example is now described.

Figure 9A:
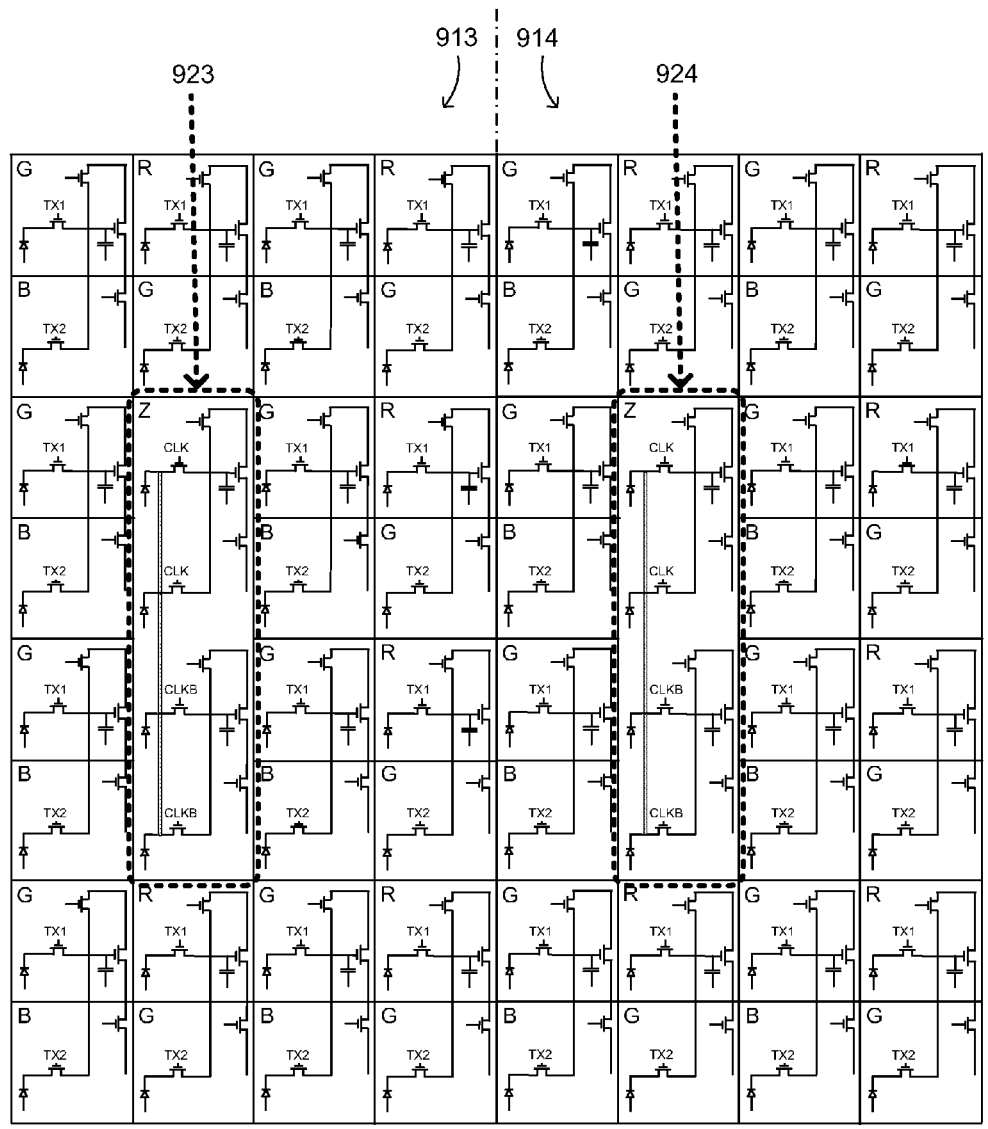
FIG. 9A is a possible circuit diagram of circuits for the pixels of two of the kernels of FIG. 8, according to an embodiment where the depth pixel is made according to a similar layout as the color pixels.

FIG. 9A is a possible circuit diagram of adjoining circuits 913, 914 for pixels for two adjoining kernels such as kernel 812. Of course, it will be understood that an array will be made from many such pixels. Depth pixels 923, 924 are made according to a substantially similar circuit layout as the color pixels of the kernels. For example, each color pixel has a transfer gate TX1 or TX2 according to a layout, and each of depth pixels 923, 924 has one or more transfer gates receiving clock signal CLK or CLKB, during normal imaging mode. The one or more transfer gates of depth pixels 923, 924 are at locations similar, according to the layout, to locations of transfer gates TX1, TX2.

Figure 9B:
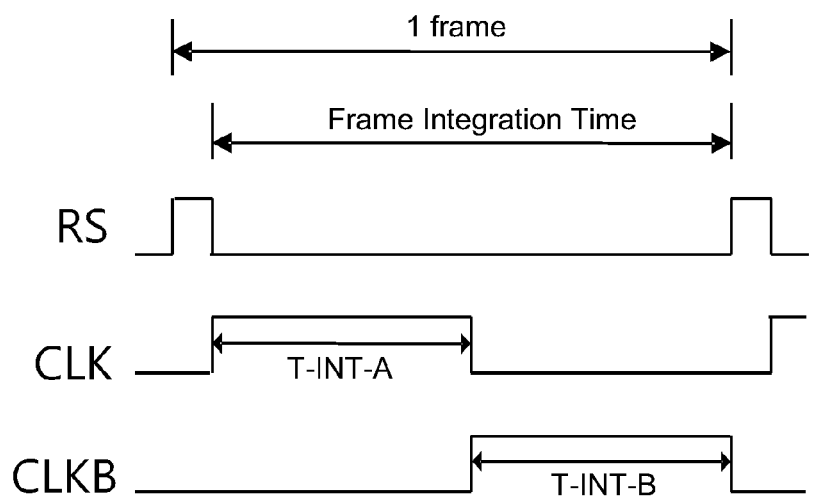
FIG. 9B is a sample embodiment of a timing diagram of control signals that can be applied to and be received by the depth pixels of FIG. 9A, when in a motion detection mode.

FIG. 9B is only about the motion detection mode of FIG. 9A. Sample control signals are shown, which can be applied to and be received by depth pixels 923, 924 of FIG. 9A. Signal RS is the reset signal.

FIG. 10 is a sample embodiment of circuit diagrams for the two pixels of FIG. 3. First pixel 1015A has similar circuitry to second pixel 1015B. The outputs are PIXOUT A and PIXOUT B, selected respectively by select signals RSELA, RSELB. These outputs are then compared.

FIG. 11 is a sample embodiment of a timing diagram of control signals that can be applied to, and received by the pixels of FIG. 10. Control signals PGA and PGB can cause pixels 1015A and 1015B to integrate, but at different times, i.e. not concurrently. It will be appreciated that these control signals are of the second type. In addition, this second type of control signals may cause the other pixels in the group that pixels 1015A and 1015B belong to, to image the object in a single frame, as defined by reset signal RG. In other words, this imaging can take place during the Frame Integration Time of FIG. 11, concurrently with integrating light in the first pixel due to signal PGA and in the second pixel due to signal PGB, such as for edge detection.

The diagrams of FIGS. 10 and 11 may be found particularly advantageous when reading depth pixels, such as those of FIGS. 7, 8 and 9A.

FIG. 12 is another sample embodiment of circuit diagrams for the two pixels of FIG. 3. First pixel 1215A has similar circuitry to second pixel 1215B. The outputs that are compared are PIXOUT A and PIXOUT B, which are read from the respective select signals RSELA, RSELB.

FIG. 13 is a sample embodiment of a timing diagram of control signals that can be applied to and be received by pixels 1215A and 1215B. Similarly with FIG. 11, control signals TXA and TXB can cause first pixel 1215A to integrate at different times than second pixel 1215B. In addition, this second type of control signals may cause the other pixels in the group that pixels 1215A and 1215B belong to, to image the object in a single frame, as defined by reset signals RSTA, RSTB. In other words, this imaging can take place during the 1 Frame time of FIG. 13, concurrently with integrating light in the first pixel due to signal TXA and in the second pixel due to signal TXB.

The diagrams of FIGS. 12 and 13 may be found particularly advantageous when reading color pixels such as those of FIGS. 4, 5, and 6. A difference of FIG. 13 from FIG. 11 is that the reset signals are not common for pixels 1215A and 1215B. Another difference is that the integration time for the first pixel plus that for the second pixel is less than the total frame integration time.

In the above embodiments, the comparison is made from the outputs of two pixels, namely the first pixel and the second pixel. More pixels can be used, for capturing more light, and their outputs can be grouped. An example is now described.

Figure 14:
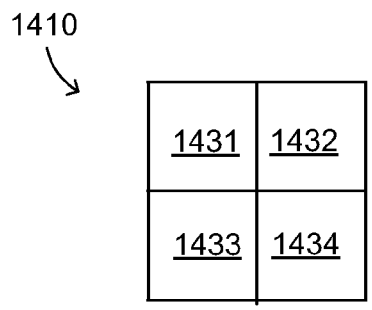
FIG. 14 is a diagram of a set of four pixels in an array according to embodiments.

FIG. 14 is a diagram of a set 1410 of four pixels 1431, 1432, 1433, 1434 in an array, made according to embodiments. Set 1410 can be part of a group of pixels, or the entire group.

In one embodiment, the first pixel can be pixel 1431, while the second pixel can be pixel 1432. The control signals can cause a third pixel, such as pixel 1433, to integrate light from the object concurrently with first pixel 1431, and a fourth pixel, such as pixel 1434, to integrate light from the object concurrently with second pixel 1432. The effective result is now described.

Figure 15:
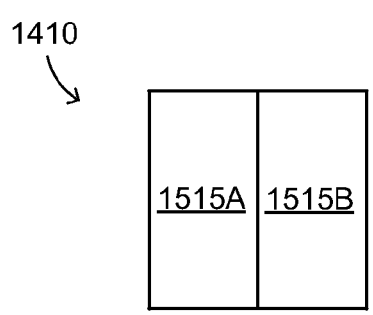
FIG. 15 is an embodiment of pairings of the pixels of FIG. 14, so that the pairs can serve as the two pixels of FIG. 3.

FIG. 15 is an embodiment of pairings of pixels in set 1410, which result from adding the outputs of pixels 1431 plus 1433, and 1432 plus 1434 as described above. Since the outputs of the pixels are added, the four pixels of set 1410 now appear as two pixels, namely 1515A and 1515B. These two apparent pixels now can serve as the two pixels of FIG. 3. In embodiments where pixels are added this way, the comparator can be configured to compare the output of the first pixel combined with an output of the third pixel, to the output of the second pixel combined with an output of the fourth pixel.

In the embodiment of FIG. 15, the outputs of the pixels of set 1410 were added by pairing neighboring pixels along vertical lines. This embodiment would help even more if it were desired to detect motion in a horizontal direction more reliably.

There is no need that the addition be along vertical lines, as shown above. For example, in another embodiment, the first pixel can be pixel 1431, while the second pixel can be pixel 1433. The control signals can cause a third pixel, such as pixel 1432, to integrate light from the object concurrently with first pixel 1431, and a fourth pixel, such as pixel 1434, to integrate light from the object concurrently with second pixel 1433. The effective result is now described.

Figure 16:
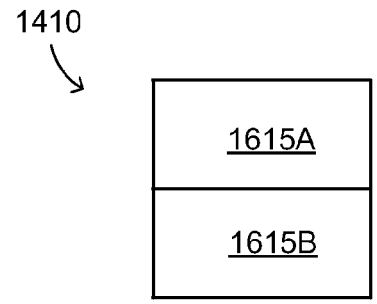
FIG. 16 is another embodiment of pairings of the pixels of FIG. 14, so that the pairs can serve as the two pixels of FIG. 3.

FIG. 16 shows another embodiment of pairings of pixels in set 1410, which result from adding the outputs of pixels 1431, 1432, 1433, 1434 as described above. Again, the pixels of set 1410 now appear as two pixels, namely 1615A and 1615B. These two seeming pixels now can serve as the two pixels of FIG. 3. The additions are by pairing neighboring pixels along horizontal lines. This embodiment would help even more if it were desired to detect motion in a vertical direction more reliably.

It should be noted that the embodiments of FIGS. 15 and 16 do not require amplifiers or comparators within pixels. As such, existing pixel designs can be used, and pixel density need not be sacrificed.

FIG. 17 is a diagram of how pixels in an array 1710 can be paired according to an embodiment. The pairing using the groupings of both FIG. 15 and FIG. 16. Accordingly, motions in both the vertical and the horizontal direction can be detected more reliably.

FIG. 18 is a diagram of how pixels in an array 1810 can be paired according to another embodiment. The pairing using the groupings of both FIG. 15 and FIG. 16. Accordingly, motions in both the vertical and the horizontal direction can be detected more reliably.

Figure 19:
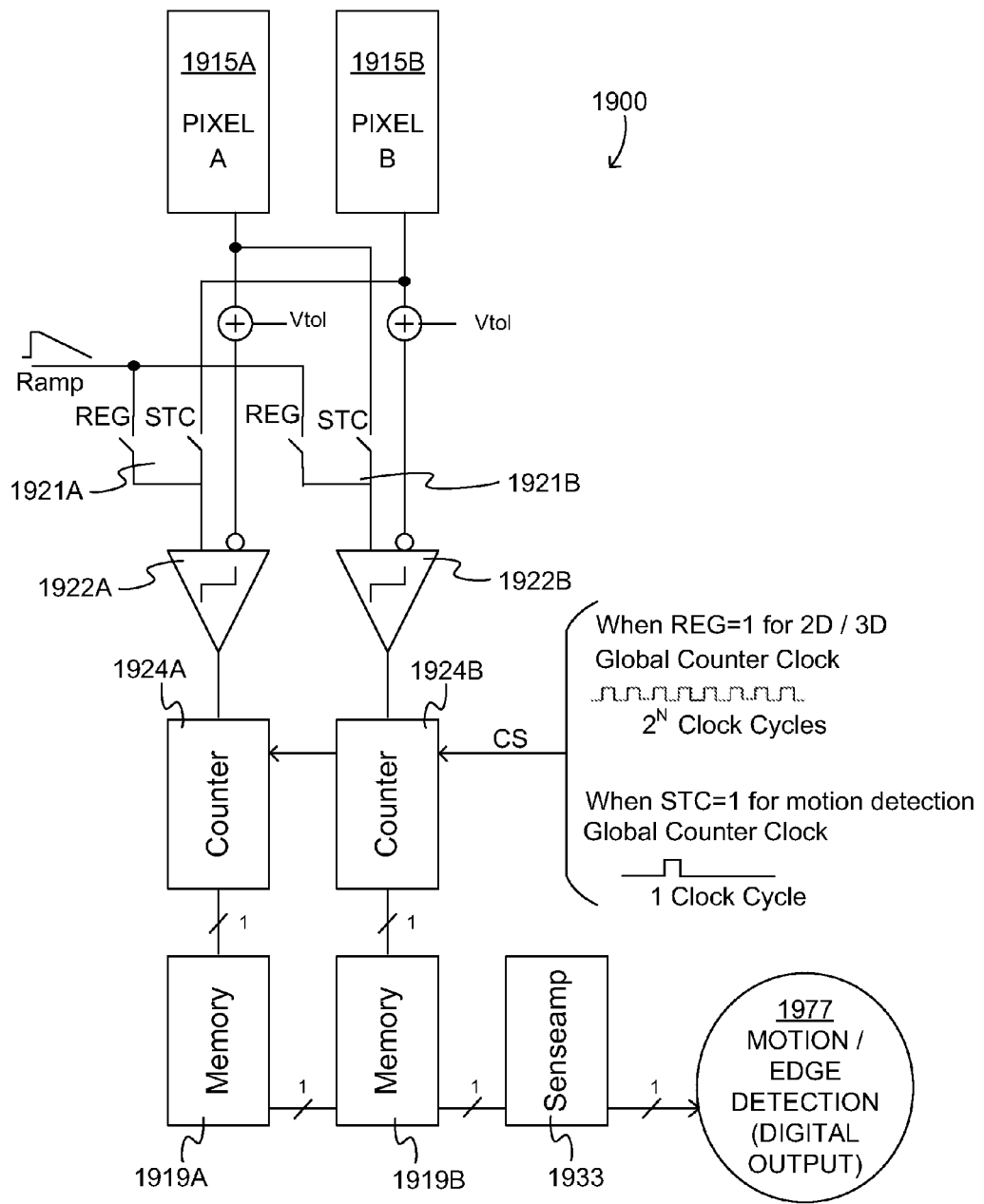
FIG. 19 is a column readout circuit diagram for pixels to perform both a regular imaging operation and the motion detection operation of FIG. 3.

FIG. 19 is a diagram for a column readout circuit 1900. Circuit 1900 includes Pixel A 1915A and Pixel B 1915B, which can also be called the first pixel and the second pixel. Pixels 1915A and 1915B could be, for example, pixels 215A, 215B of group 210, and/or pixels 315A and 315B of FIG. 3. It will be appreciated that circuit 1900 permits pixels 1915A and 1915B to be used both for a regular imaging operation and for a motion detection operation.

Circuit 1900 also includes, associated with Pixel A 1915A, a switch 1921A, a comparator 1922A, a counter 1924A, and a memory 1919A. Circuit 1900 further includes, associated with Pixel B 1915B, a switch 1921B, a comparator 1922B, a counter 1924B, and a memory 1919B.

In regular imaging operation, switch 1921A closes for the "REG" value, which is also indicated as REG=1. Then a ramp is input in comparator 1922A, and therefore memory 1919A stores an output that derives from first pixel 1915A, but not from second pixel 1915B. The output of first pixel 1915A can be a number counted by counter 1924A. The output of first pixel 1915A is thus used to contribute for rendering an image, whether two-dimensional or including depth information. Similarly, the output of Pixel B 1915B can contribute to rendering an image.

Alternately, in motion detection operation, switch 1921A closes for the "STC" value, which is also indicated as REG=1. Then comparator 1922A receives outputs from both Pixel A 1915A and Pixel B 1915B, and therefore memory 1919A stores an output that derives from both first pixel 1915A and from second pixel 1915B. Similarly, memory 1919B can store similarly computed outputs. A comparator is implemented by a sense amplifier 1933, which can sense a difference between the contents of memories 1919A and 1919B, so as to derive output 1977.

Output 1977 informs of detected motion or image edge. Output 1977 may be interpreted as motion in the motion detection operation of STC=1, and as an image edge in the imaging operation of REG=1.

In some embodiments, switches 1921A, 1921B transition from the motion detection operation of STC=1 to the imaging operation of REG=1 responsive to the motion being detected during the motion detection operation. In those instances, then, switch 1921A transitions from causing memory 1919A to store an output deriving from first pixel 1915A and second pixel 1915B, to causing memory 1919A to store an output deriving from first pixel 1915A but not from second pixel 1915B.

Figure 20:
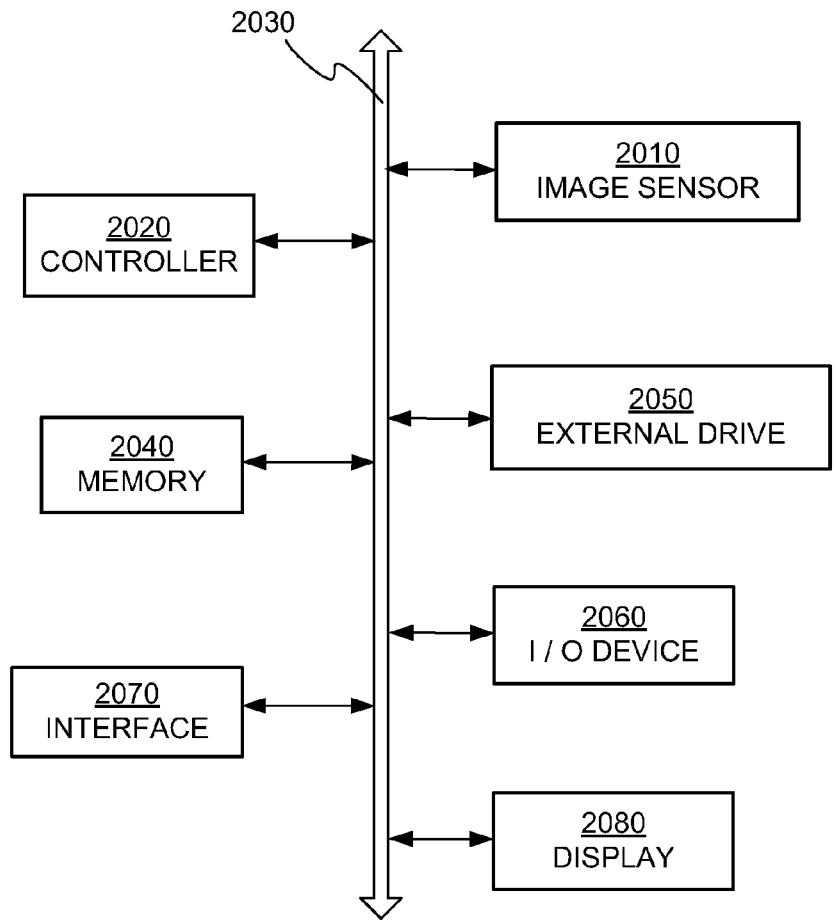
FIG. 20 depicts a controller-based system for an imaging device made according to embodiments.

FIG. 20 depicts a controller-based system 2000 for an imaging device made according to embodiments. System 2000 could be for the device of FIG. 1.

System 2000 includes an image sensor 2010, which is made according to embodiments, such as by a pixel array. As such, system 2000 could be, without limitation, a computer system, an imaging device, a camera system, a scanner, a machine vision system, a vehicle navigation system, a smart telephone, a video telephone, a personal digital assistant (PDA), a mobile computer, a surveillance system, an auto focus system, a star tracker system, a motion detection system, an image stabilization system, a data compression system for high-definition television, and so on.

System 2000 further includes a controller 2020, which is made according to embodiments. Controller 2020 could be controller 120 of FIG. 1. Controller 2020 could be a Central Processing Unit (CPU), a digital signal processor, a microprocessor, a microcontroller, an application-specific integrated circuit (ASIC), a programmable logic device (PLD), and so on. In some embodiments, controller 2020 communicates, over bus 2030, with image sensor 2010. In some embodiments, controller 2020 may be combined with image sensor 2010 in a single integrated circuit. Controller 2020 controls and operates image sensor 2010, by transmitting control signals from output ports, and so on, as will be understood by those skilled in the art.

Controller 2020 may further communicate with other devices in system 2000. One such other device could be a memory 2040, which could be a Random Access Memory (RAM) or a Read Only Memory (ROM), or a combination. Memory 2040 may be configured to store instructions to be read and executed by controller 2020. Memory 2040 may be configured to store images captured by image sensor 2010, both for short term and long term.

Another such device could be an external drive 2050, which can be a compact disk (CD) drive, a thumb drive, and so on. One more such device could be an input/output (I/O) device 2060 for a user, such as a keypad, a keyboard, and a display. Memory 2040 may be configured to store user data that is accessible to a user via the I/O device 2060.

An additional such device could be an interface 2070. System 2000 may use interface 2070 to transmit data to or receive data from a communication network. The transmission can be via wires, for example via cables, or USB interface. Alternately, the communication network can be wireless, and interface 2070 can be wireless and include, for example, an antenna, a wireless transceiver and so on. The communication interface protocol can be that of a communication system such as CDMA, GSM, NADC, E-TDMA, WCDMA, CDMA2000, Wi-Fi, Muni Wi-Fi, Bluetooth, DECT, Wireless USB, Flash-OFDM, IEEE 802.20, GPRS, iBurst, WiBro, WiMAX, WiMAX-Advanced, UMTS-TDD, HSPA, EVDO, LTE-Advanced, MMDS, and so on.

One more such device can be a display 2080. Display 2080 can show to a user a tentative image that is received by image sensor 2010, so to help them align the device, perhaps adjust imaging parameters, and so on.

Methods of the invention are now described.

Figure 21:
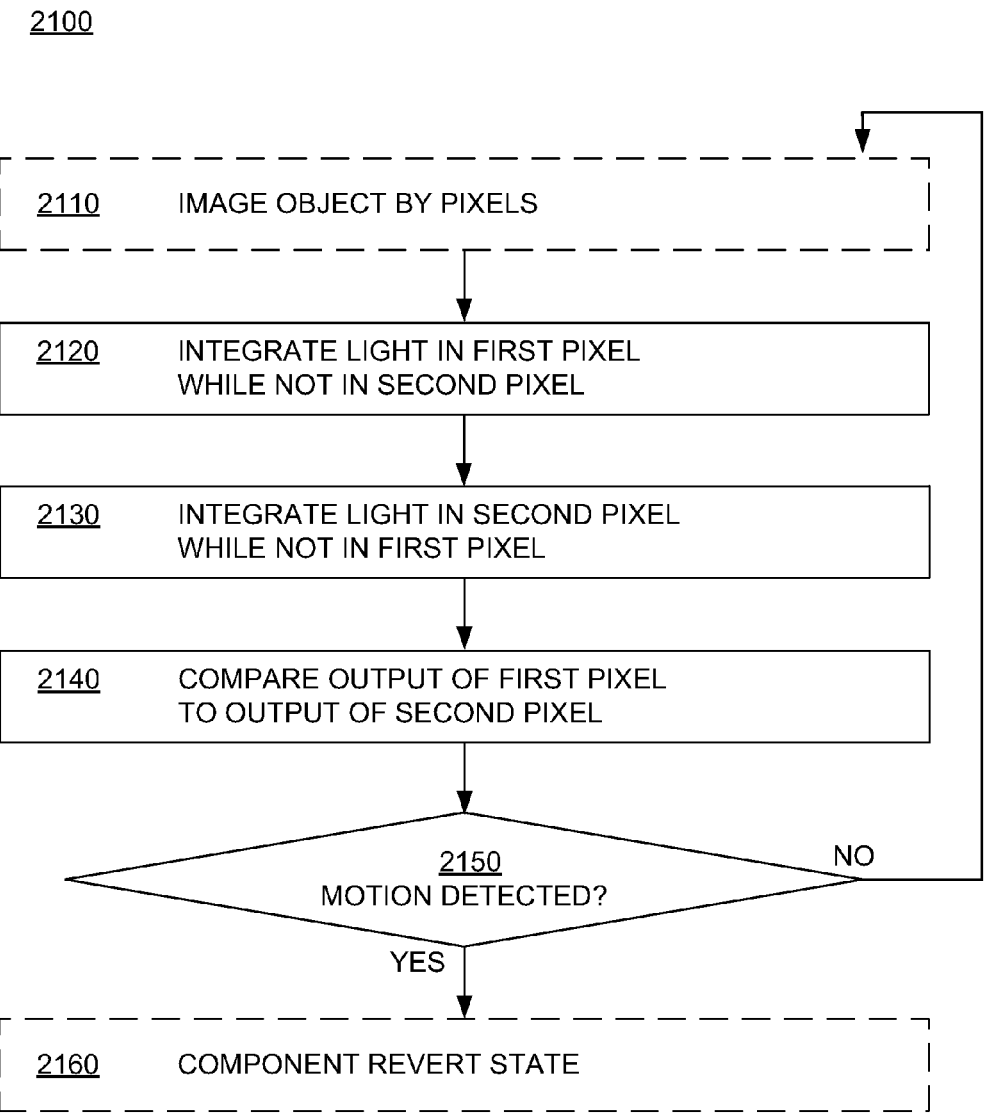
FIG. 21 is a flowchart for illustrating methods according to embodiments.

FIG. 21 shows a flowchart 2100 for describing methods according to embodiments. The methods of flowchart 2100 may also be practiced by embodiments described above, such as by an imaging device that includes a controller and an array having pixels.

According to an optional operation 2110, an object is imaged in a group of the pixels. Imaging may be with all the pixels in the group, or just some. Imaging may be so as to detect a color of the object, or a distance of the object with respect to the array, or both.

According to another operation 2120, light is integrated from the object in a first pixel in the group, while not in a second pixel in the group. Such can be accomplished by suitable control signals.

According to another operation 2130, light is integrated from the object in the second pixel while not in the first pixel. Such can be accomplished by suitable control signals.

In some embodiments, light is further integrated from the object in other pixels in the group in a single frame, concurrently with operations 2120 and 2130. Moreover, in some embodiments, an additional third pixel integrates light concurrently with the first pixel, and an additional fourth pixel integrates light concurrently with the second pixel.

According to another operation 2140, an output of the first pixel is compared to an output of the second pixel. A difference in the comparison is performed so as to detect a motion of the pixel array with respect to the object. If a third and a fourth pixel have also integrated light, their outputs are added to those of the first and the second pixel respectively for the comparison.

According to another, optional operation 2150, if no motion is detected, execution returns to operation 2110. In some embodiments, the imaging device further includes an additional component that is configured to be in a first state or a second state. If no motion is detected, then the component can remain in the same state that it is, which could be the first state.

If, at operation 2150 motion is detected then, according to another optional operation 2160, the component reverts from the first state to the second state, responsive to the motion being detected.

According to one more optional operation, the output of the first pixel is switched from being compared as above, to imaging an aspect of the object. The aspect can be the color of the object, or its distance with respect to the array. The same may take place also with the second pixel. In some embodiments, the switching is performed responsive to the motion being detected. Regardless why switching was performed, after it was performed, an object may be imaged in all the pixels in the group, so as to detect the color or the distance of the object.

Figure 22:
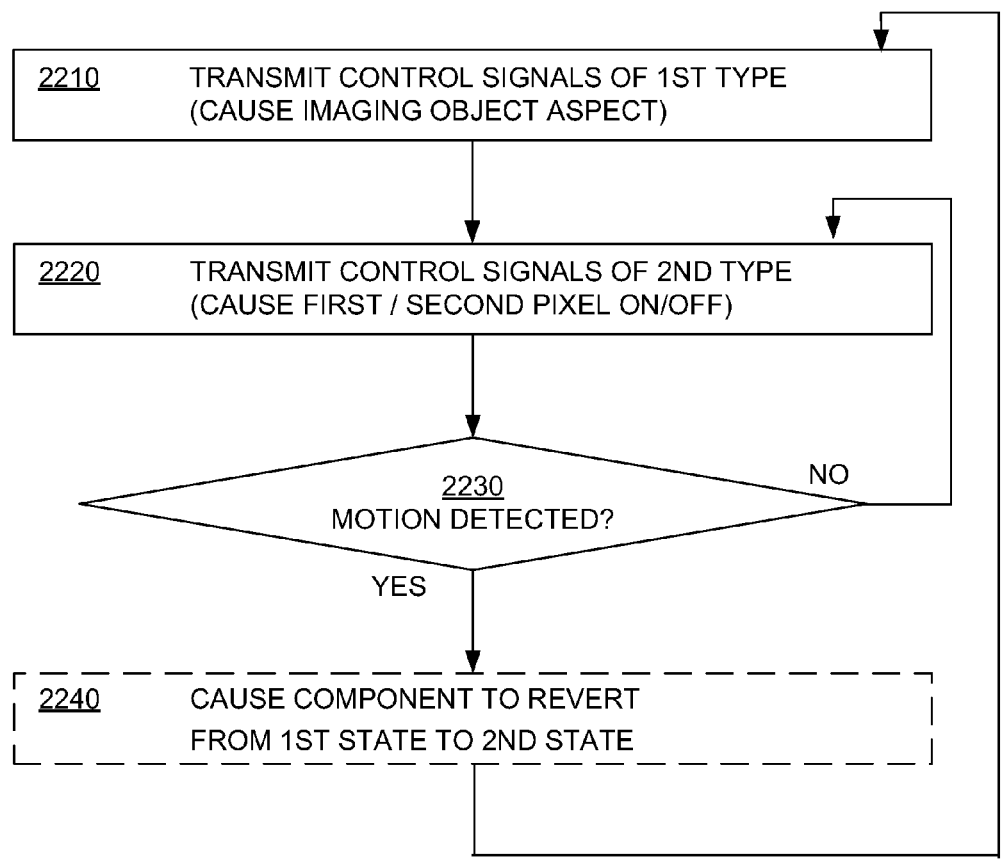
FIG. 22 is a flowchart for illustrating methods according to embodiments.

FIG. 22 shows a flowchart 2200 for describing methods according to embodiments. The methods of flowchart 2200 may also be practiced by embodiments described above, such as a controller of an imaging device that includes an array having pixels.

According to an operation 2210, control signals of a first type are transmitted to a group of the pixels. These signals are intended to cause the pixels in the group to image an aspect of an object.

According to another operation 2220, control signals of a second type are transmitted to a group of the pixels. These signals are intended to cause a first pixel in the group to integrate light from the object while a second pixel in the group does not, and then the second pixel to integrate light from the object while the first pixel does not.

According to another operation 2230, it is inquired whether motion was detected. Detection can be by comparing an output of the first pixel to an output of the second pixel. If no motion is detected, then execution may optionally return to operation 2220, for example to continue to conserve power.

If motion is detected at operation 2230, then execution may return to operation 2210, with again transmitting control signals of the first type. In addition, if the imaging device also includes an additional component that can be in a first state or a second state, then according to another, optional operation 2240, the component can be caused to revert from the first state to the second state, in conjunction with returning to operation 2210.

In the methods described above, each operation can be performed as an affirmative step of doing, or causing to happen, what is written that can take place. Such doing or causing to happen can be by the whole system or device, or just one or more components of it. In addition, the order of operations is not constrained to what is shown, and different orders may be possible according to different embodiments. Moreover, in certain embodiments, new operations may be added, or individual operations may be modified or deleted. The added operations can be, for example, from what is mentioned while primarily describing a different system, device or method.

This description includes one or more examples, but that does not limit how the invention may be practiced. Indeed, examples or embodiments of the invention may be practiced according to what is described, or yet differently, and also in conjunction with other present or future technologies.

A person skilled in the art will be able to practice the present invention in view of this description, which is to be taken as a whole. Details have been included to provide a thorough understanding. In other instances, well-known aspects have not been described, in order to not obscure unnecessarily the present invention.

Other embodiments include combinations and sub-combinations of features described herein, including for example, embodiments that are equivalent to: providing or applying a feature in a different order than in a described embodiment, extracting an individual feature from one embodiment and inserting such feature into another embodiment; removing one or more features from an embodiment; or both removing a feature from an embodiment and adding a feature extracted from another embodiment, while providing the advantages of the features incorporated in such combinations and sub-combinations.

The following claims define certain combinations and sub-combinations of elements, features and steps or operations, which are regarded as novel and non-obvious. Additional claims for other such combinations and subcombinations may be presented in this or a related document.

What is claimed is:

1. An imaging device, comprising:
   a pixel array having pixels; and
   a controller configured to transmit to a group of the pixels
      control signals of a first type so as to cause the pixels in the group to concurrently image an aspect of an object, and of a second type so as to cause:
      a first pixel in the group to integrate light from the object while a second pixel in the group does not,
      the second pixel to integrate light from the object while the first pixel does not, and
      other pixels in the group to image the object in a single frame, concurrently with integrating light in both the first pixel and the second pixel; and
   a comparator configured to compare an output of the first pixel to an output of the second pixel so as to detect a motion of the object.

2. The device of claim 1, further comprising:
   an additional component configured to be in one of a first state and a second state, and
   in which the component transitions from the first state to the second state responsive to the motion being detected.

3. The device of claim 1, in which the controller is formed integrally with the array.

4. The device of claim 1, in which the comparator is formed integrally with the array.

5. The device of claim 1, in which the first pixel is made substantially identically to at least one other pixel in the group.

6. The device of claim 1, in which the first pixel is made substantially identically to the second pixel.

7. The device of claim 1, in which the aspect is one of a color of the object and a distance of the object with respect to the array.

8. The device of claim 1, in which the pixels include color pixels.

9. The device of claim 1, in which there is at most one other pixel between the first pixel and the second pixel.

10. The device of claim 1, in which substantially all pixels in the group are made substantially identically to each other.

11. The device of claim 1, in which the pixels include depth pixels.

12. The device of claim 1, in which the pixels include color pixels and at least one depth pixel.

13. The device of claim 12, in which
each color pixel has a transfer gate according to a layout, and
the depth pixel has a transfer gate at a location substantially similar, according to the layout, to locations of the transfer gates of the color pixels.

14. The device of claim 1, in which
the second type of control signals cause:
a third pixel in the group to integrate light from the object concurrently with the first pixel, and
a fourth pixel in the group to integrate light from the object concurrently with the second pixel, and
the comparator is configured to compare the output of the first pixel combined with an output of the third pixel, to the output of the second pixel combined with an output of the fourth pixel.

15. The device of claim 1, further comprising:
a memory; and
a switch configured to cause the memory to store either an output deriving from the first pixel but not from the second pixel, or an output deriving from the first pixel and the second pixel.

16. The device of claim 15, further comprising:
a counter; and
in which the output of the first pixel is a number counted by the counter.

17. The device of claim 15, in which the switch transitions from causing the memory to store an output deriving from the first pixel and the second pixel, to causing the memory to store an output deriving from the first pixel but not from the second pixel responsive to the motion being detected.

18. A method for operating an imaging device that includes a controller and an array having a group of pixels, comprising:
integrating light from an object in a first one of the pixels while not in a second one of the pixels;
integrating light from the object in the second pixel while not in the first pixel;
integrating light from the object in other pixels in the group in a single frame, concurrently with integrating light in both the first pixel and the second pixel; and
comparing an output of the first pixel to an output of the second pixel so as to detect a motion of the object.

19. The method of claim 18, in which
the imaging device further includes an additional component configured to be in a first state or a second state,
and further comprising: the component reverting from the first state to the second state responsive to the motion being detected.

20. The method of claim 18, further comprising:
integrating light from the object in a third one of the pixels concurrently with the first pixel;
integrating light from the object in a fourth one of the pixels concurrently with the second pixel, and
in which the comparing is performed by comparing the output of the first pixel combined with an output of the third pixel to the output of the second pixel combined with an output of the fourth pixel.

21. The method of claim 18, further comprising:
switching the output of the first pixel from being compared to imaging an aspect of the object.

22. The method of claim 21, in which the aspect includes one of the color of the object and a distance of the object with respect to the array.

23. The method of claim 21, in which the output of the first pixel is switched responsive to the motion being detected.

24. The method of claim 18, further comprising:
imaging an aspect of the object in all the pixels in the group.

25. A method for operating a controller of an imaging device that includes an array having a plurality of pixels, comprising:
transmitting to a group of the pixels control signals of a first type so as to cause the pixels in the group to image an aspect of an object;
transmitting to the pixels in the group control signals of a second type so as to cause:
a first pixel in the group to integrate light from the object while a second pixel in the group does not, and
the second pixel to integrate light from the object while the first pixel does not,
other pixels in the group to image the object in a single frame, concurrently with integrating light in both the first pixel and the second pixel; and
comparing an output of the first pixel to an output of the second pixel so as to detect a motion of the object.

26. The method of claim 25, in which the aspect is one of a color of the object and a distance of the object with respect to the array.

27. The method of claim 25, in which the imaging device also includes an additional component configured to be in a first state or a second state, and further comprising:
causing the component to revert from the first state to the second state responsive to the motion being detected.

28. The method of claim 25, in which
the second type of control signals cause:
a third pixel in the group to integrate light from the object concurrently with the first pixel, and
a fourth pixel in the group to integrate light from the object concurrently with the second pixel, and
the comparing is performed by comparing the output of the first pixel combined with an output of the third pixel to the output of the second pixel combined with an output of the fourth pixel.

29. The method of claim 25, further comprising:
transmitting again control signals of the first type responsive to the motion being detected.

* * * * *